(12) United States Patent
Bieberdorf et al.

(10) Patent No.: US 7,201,490 B1
(45) Date of Patent: Apr. 10, 2007

(54) AIRPORT LIGHT INSTALLATION WITH SPLIT RING ADAPTER

(76) Inventors: Roger Bieberdorf, 3060 N. Ridgecrest #115, Mesa, AZ (US) 85207; Gordon R. Fritz, 212 S. Malcolm Dr., Apache Junction, AZ (US) 85220

( * ) Notice: Subject to any disclaimer, the term of this patent is extended or adjusted under 35 U.S.C. 154(b) by 164 days.

(21) Appl. No.: 10/981,159

(22) Filed: Nov. 4, 2004

(51) Int. Cl.
*F21S 8/00* (2006.01)
(52) U.S. Cl. .................. 362/153; 362/470; 362/362
(58) Field of Classification Search ............... 362/153, 362/153.1, 470, 362; 220/4.02, 377, 622, 220/640, 729
See application file for complete search history.

(56) References Cited

U.S. PATENT DOCUMENTS 1,491,145 A * 4/1924 Lange et al. ............. 362/153.1
5,450,300 A * 9/1995 Rector, Jr. ............... 362/153.1

* cited by examiner

*Primary Examiner*—Sandra O'Shea
*Assistant Examiner*—Mark Tsidulko
(74) *Attorney, Agent, or Firm*—Parsons & Goltry; Michael W. Goltry; Robert A. Parsons (57) ABSTRACT

Disclosed is an airport light base including a light base container having an upper end with an inverted first flange having a first outer face, an opposing first inner face facing into the light base container, a continuous inwardly directed first edge bounding a first opening into the light base container, and ring segments affixed to the inner face of the first flange forming an inverted second flange under the first opening outboard of the first edge, the second flange for reception of an inset light fixture thereon and having a second outer face facing the first opening, an opposing second inner face facing into the light base container, and a continuous inwardly directed second edge bounding a second opening into the light base container, wherein the second opening is smaller than the first opening.

20 Claims, 6 Drawing Sheets

AIRPORT LIGHT INSTALLATION WITH SPLIT RING ADAPTER

BACKGROUND OF THE INVENTION

1. Field of the Invention

The present invention relates to airport light installations.

2. Related Art and Prior Art Statement

Modern airports incorporate specialized lighting systems including, for instance, runway touchdown zone lighting systems, runway centerline lighting systems, taxiway centerline lighting systems, and edge lighting systems. Edge lighting systems are important because they help define runways and taxiways and inhibit pilots from inadvertently driving their airplanes off the designated runway and taxiway areas.

Typical edge light installations incorporate a light fixture assembly that is attached to a container embedded into the ground. Exemplary edge light fixtures include elevated light fixtures and bidirectional inset light fixtures. Inset light fixtures are low-profile light fixtures, and are used where it is impracticable to use elevated light fixtures.

Elevated light fixtures and inset light fixtures have different structural geometries and require their own specialized mounting containers. In fact, the geometries of the mounting containers for elevated light fixtures and inset light fixtures are considerably different from one another. As a result, replacing elevated light fixtures with inset light fixtures, and vice versa, is time consuming and expensive because it requires removal and replacement of the containers, which thus necessitates certain new and useful improvements in the art.

SUMMARY OF THE INVENTION

According to the invention, there is provided an airport light base including a light base container having an upper end with an inverted first flange having a first outer face, an opposing first inner face facing into the light base container, and a continuous inwardly directed first edge bounding a first opening into the light base container. Ring segments, affixed to the inner face of the first flange, form an inverted second flange under the first opening outboard of the first edge for reception of an inset light fixture thereon and having a second outer face facing the first opening, an opposing second inner face facing into the light base container, and a continuous inwardly directed second edge bounding a second opening into the light base container, wherein the second opening is smaller than the first opening. First bolt holes through the first flange register with second bolt holes through the ring segments, and bolts through the first and second bolt holes secure the ring segments to the first flange. In a preferred embodiment, the ring segments consist of equally-sized first and second ring segments. An inset light fixture is affixed to the second outer face of the second flange. A continuous inwardly directed third edge is formed by the ring segments between the first and second flanges, which is substantially flush with the first edge and defining a third opening substantially equal in size to, and forming an extension of, the first opening.

In an airport light base container having an upper end with an inverted first flange having a first outer face, an opposing first inner face facing into the light base container, and a first continuous inwardly directed edge bounding a first opening into the light base container, improvements therein in accordance with the invention include ring segments, affixed to the inner face of the first flange, forming an inverted second flange under the first opening outboard of the first edge, the second flange for reception of an inset light fixture thereon and having a second outer face facing the first opening, an opposing second inner face facing into the light base container, and a continuous inwardly directed second edge bounding a second opening into the light base container, wherein the second opening is smaller than the first opening. First bolt holes through the first flange register with second bolt holes through the ring segments, and bolts through the first and second bolt holes secure the ring segments to the first flange. In a preferred embodiment, the ring segments consist of equally-sized first and second ring segments. An inset light fixture is affixed to the second outer face of the second flange. A continuous inwardly directed third edge is formed by the ring segments between the first and second flanges, which is substantially flush with the first edge and defining a third opening substantially equal in size to, and forming an extension of, the first opening.

According to the invention, there is provided an airport light base including a light base container having an upper end with an inverted first flange having a continuous inwardly directed first edge bounding a first opening into the light base container. Ring segments, affixed to the first flange, form an inverted second flange outboard of the first edge for reception of an inset light fixture thereon and having a continuous inwardly directed second edge bounding a second opening into the light base container, wherein the second opening is smaller than, and coaxial with, the first opening. First bolt holes through the first flange register with second bolt holes through the ring segments, and bolts through the first and second bolt holes secure the ring segments to the first flange. In a preferred embodiment, the ring segments consist of equally-sized first and second ring segments.

In an airport light base container having an upper end with an inverted first flange having a continuous inwardly directed first edge bounding a first opening into the light base container, improvements therein include ring segments, affixed to the first flange, forming an inverted second flange outboard of the first edge for reception of an inset light fixture thereon and having a continuous inwardly directed second edge bounding a second opening into the light base container, wherein the second opening is smaller than, and coaxial with, the first opening. First bolt holes through the first flange register with second bolt holes through the ring segments, and bolts through the first and second bolt holes secure the ring segments to the first flange. In a preferred embodiment, the ring segments consist of equally-sized first and second ring segments.

Consistent with the foregoing summary of preferred embodiments, and the ensuing detailed description, which are to be taken together, the invention also contemplates associated apparatus and method embodiments.

BRIEF DESCRIPTION OF THE DRAWINGS

Referring to the drawings.

DETAILED DESCRIPTION OF PREFERRED EMBODIMENTS

Figure 1:
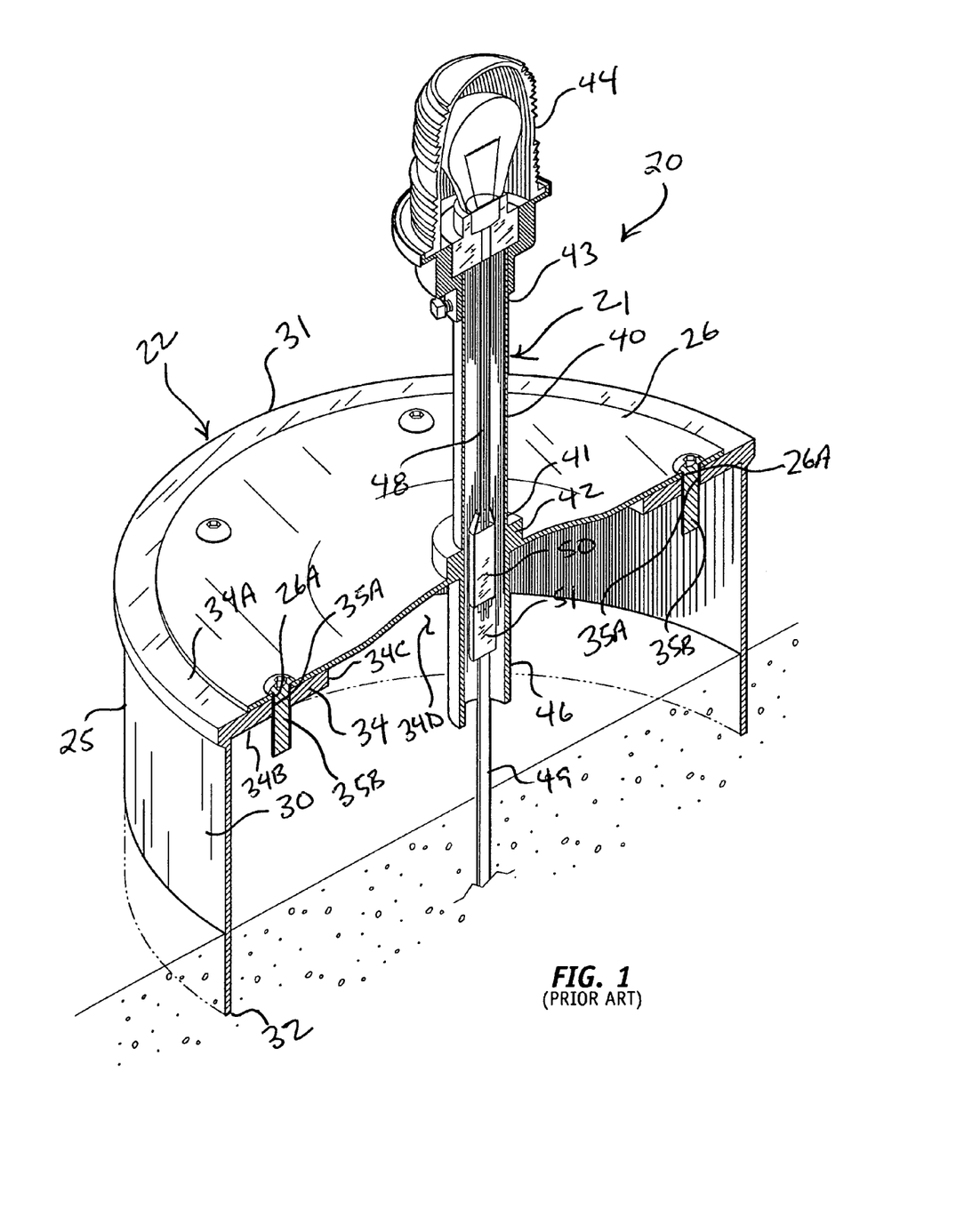
FIG. 1 is an isometric view, partially in section, of a prior art airport light installation including an elevated light fixture assembly secured to an inverted flange of a light base container.

Turning now to the drawings, in which like reference characters indicate corresponding elements throughout the several views, attention is first directed to FIG. 1 in which there is seen a prior art airport light installation 20 including an elevated light fixture assembly 21 attached to and depending upwardly from a light base or support 22. Support 22 is to be partially embedded adjacent a runway or taxiway area so as to form part of a set-in-the-ground airport lighting system. Support 22 consists of a light base container 25, which is attached to a cover or lid 26 forming part of light fixture assembly 21. Container 25 and lid 26 are each fashioned from steel, aluminum, or other selected metal or metal composite, plastic, paper, etc. Container 25 consists of a continuous sidewall 30 having an upper extremity or end 31, and an opposing lower extremity or end 32. Lower extremity 32 is open in the drawings, but it is usually closed with a bottom plate (not shown). Upper extremity 31 is constructed with an inverted flange 34 having an outer/upper face 34A, an opposing inner/lower face 34B directed into container 25, and a continuous inwardly directed edge 34C bounding an opening 34D into container 25. A standard set of threaded bolt holes 35A through flange 34 match a corresponding standard set of openings 26A through lid 26, which permits lid 26 to be bolted onto flange 34 with threaded bolts 35B in a conventional manner.

Figure 2:
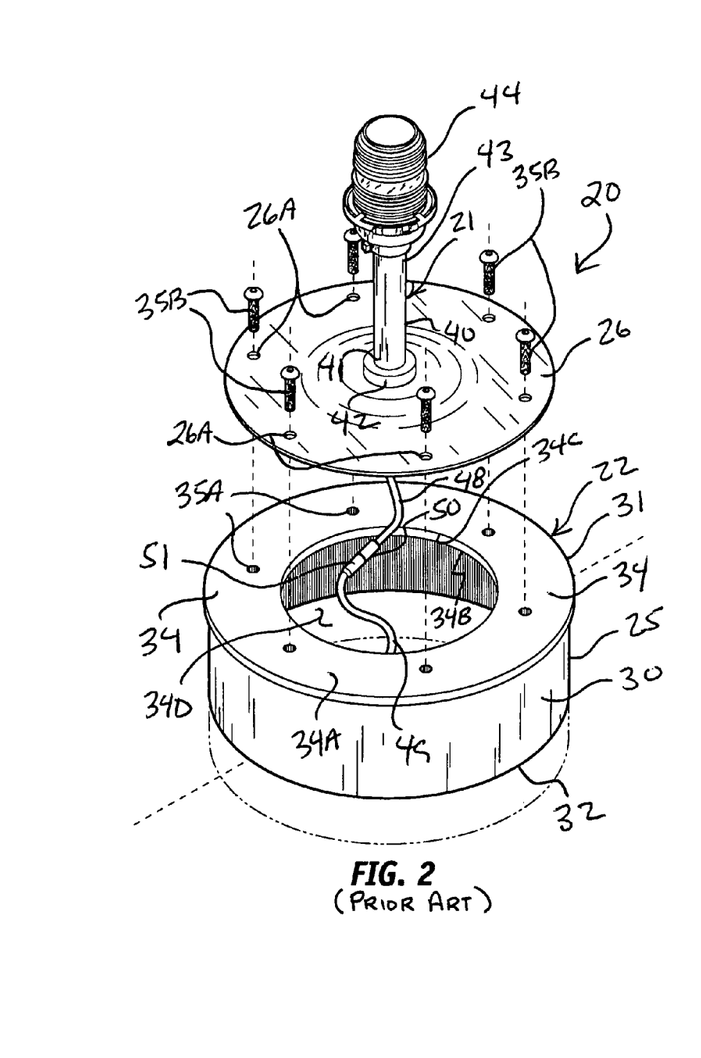
FIGS. 2 and 3 are isometric views of the prior art airport light installation of FIG. 1, with the elevated light fixture shown as it would appear being detached from the inverted flange.
Figure 3:
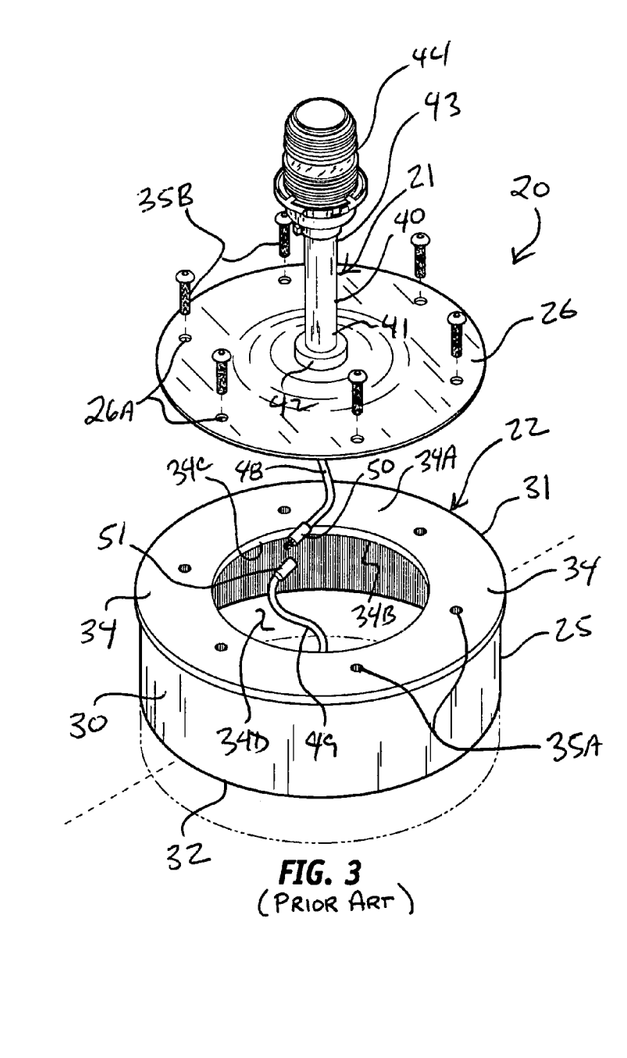

Light fixture assembly 21 additionally includes an elongate, rigid column 40 having a proximal end 41 attached to a coupling 42 secured to lid 26 at a generally central location thereof, and an opposing distal end 43. A light fixture 44 is attached to, and carried by, distal end 43 in a conventional manner. A cylindrical sleeve 46 depends downwardly from coupling 42, which may be of any selected design. Electrical wiring 48 is coupled to light fixture 44 and passes downwardly through column 40 and coupling 42 and through sleeve 46, which connects to electrical cabling 49 provided throughout the infrastructure of an airport lighting system. Electrical wiring 48 incorporates an electrical connector 50, which couples to a corresponding electrical connector 51 of electrical cabling 49. Connectors 50 and 51 cooperate and form an electrical plug. Bolts 35B provide for the removable attachment of lid 26 to container 25, so that lid 26 can be easily removed as in FIGS. 2 and 3 for replacement or maintenance. In FIG. 2, bolts 35B are detached and light fixture assembly 21 disengaged from, and shown positioned above, container 25. The illustration in FIG. 3 is very similar to that of FIG. 2, but that connectors 50 and 51 are shown detached from one another in FIG. 3 completing the detachment of light fixture assembly 21.

Light base container 25 is typical and exemplary of those that are known and currently in use in airport lighting applications. Installation 20 is an elevated light installation, and light fixture assembly 21 is typical and exemplary of those elevated light fixtures that are known and currently in use in airport lighting applications. Container 25, including its inverted flange 34 and bolt holes 35A therethrough, is, more particularly, an elevated light base container, and is specifically adapted and arranged to be used with an elevated light fixture assembly, such as elevated light fixture assembly 21. Further details of container 25 and light fixture assembly 21 will readily occur to those skilled in the art and will not be discussed in further detail.

Figures 9, 10, 11:
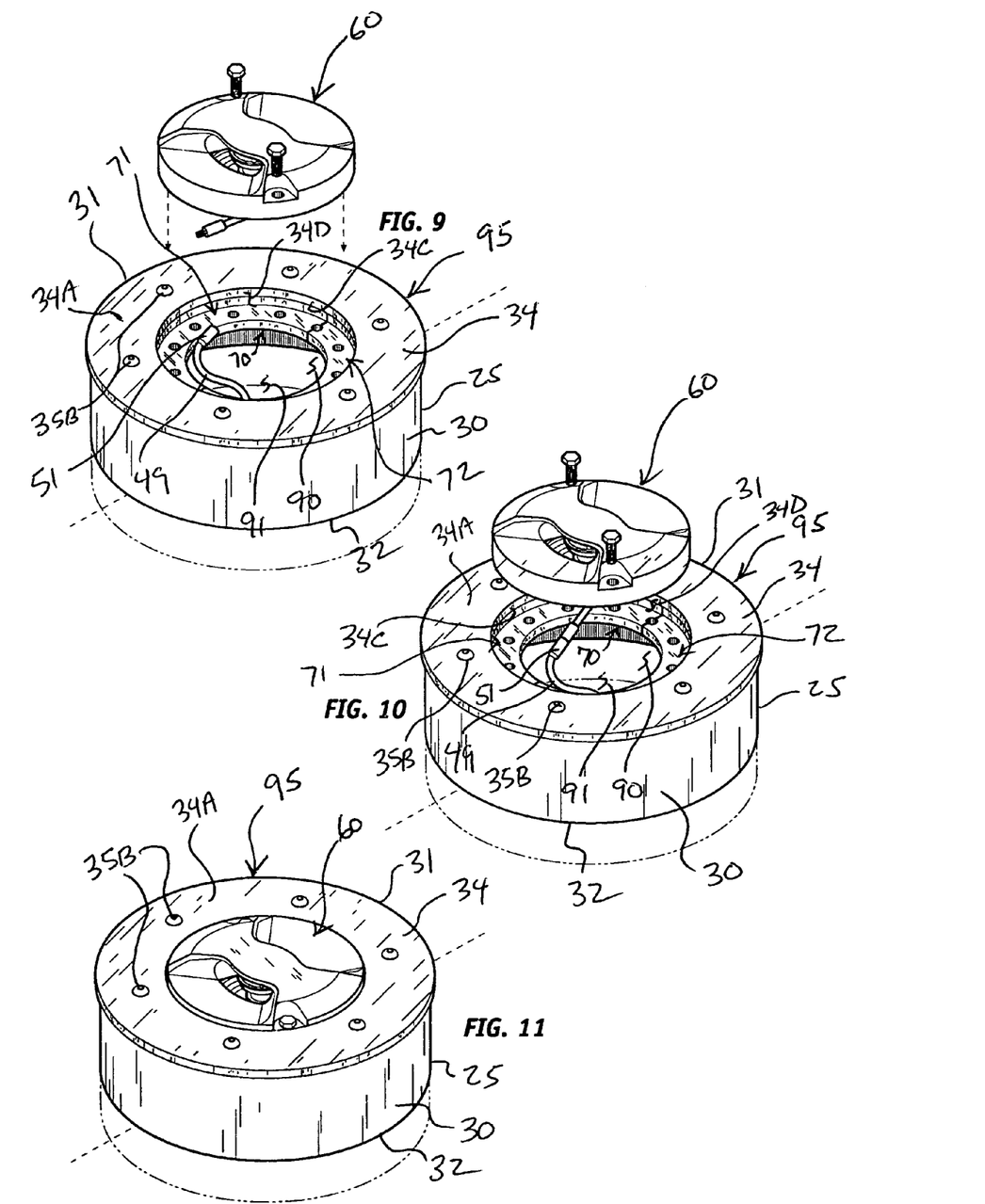
FIGS. 9–11 are isometric views showing the installation of an inset light fixture to the inset light base container of FIG. 7 to form an inset light base container.

The invention is concerned with converting container 25 from its currently geometry for use with an elevated light fixture assembly to a new geometry so that it may be used with an inset light fixture assembly, such as the one denoted at 60 in FIG. 9, which is a well-known and readily available type. To provide a way to convert container 25 into one that is to be used in conjunction with an inset light fixture assembly, attention is now directed to FIG. 4, which shows, according to the invention, a split ring adapter 70.

Figure 4:
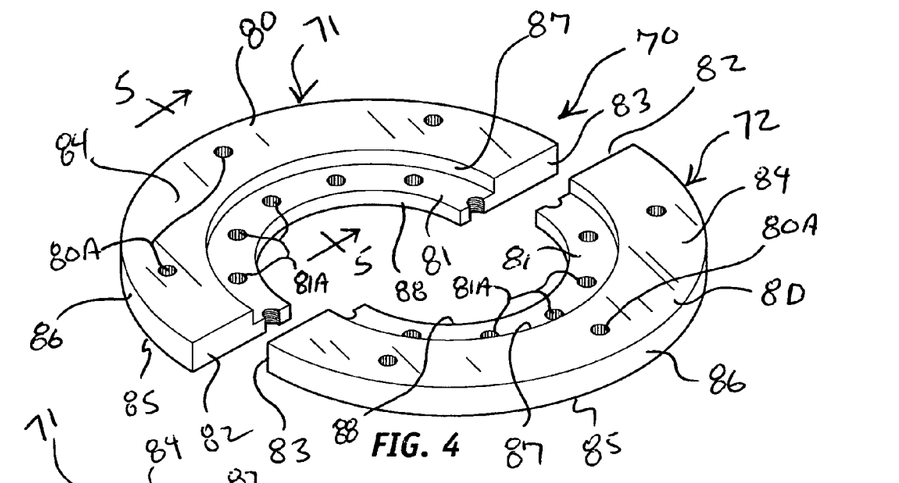
FIG. 4 is an isometric view of a split ring adapter, in accordance with the principle of the invention.

Adapter 70 consists of ring segments 71 and 72. Ring segments 71 and 72 are substantially identical to one another in size and structure, and the structural details only of segment 71 will be discussed, with the understanding the ensuing discussion of ring segment 71 applies to ring segment 72.

Figures 5, 6:
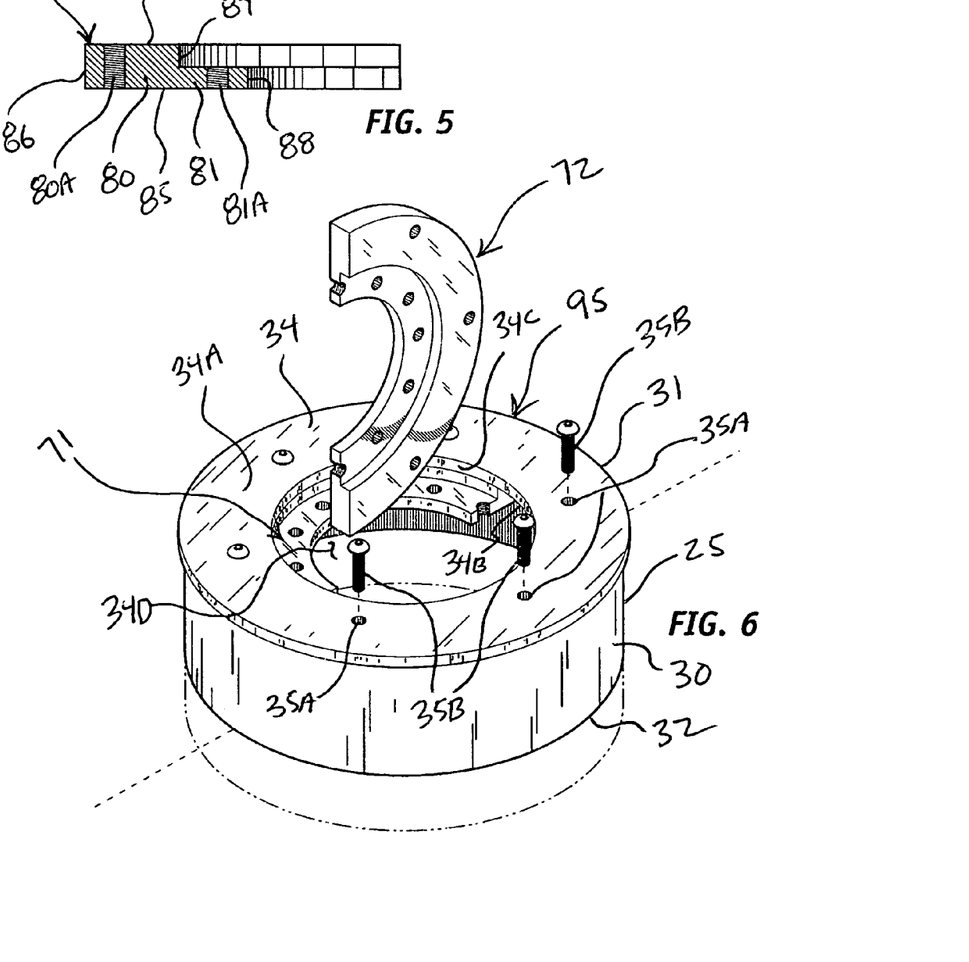
FIG. 5 is a sectional view taken along line 5—5 of FIG. 4.
FIG. 6 is an isometric view of the light base container of FIG. 1, with the split ring adapter of FIG. 4 shown as it would appear being secured to the inverted flange to form an inset light base container.

Ring segment 71 is strong and rigid and fashioned from steel, aluminum, or other selected metal, metal composite, or the like, and is integrally formed or otherwise cast as a single piece, or fashioned as an assembly of two or more rigidly attached parts, with integral formation being preferred for enhanced strength characteristics. Ring segment 71 consists of two main parts, namely, a base 80 and a flange segment 81. In shape, base 80 is generally flat and C-shaped, and flange segment 81 inwardly-curved, and generally flat and C-shaped as well. Base 80 has opposing ends 82 and 83, opposing upper and lower surfaces 84 and 85, an outer outwardly-curved concave edge 86, and an opposing inner inwardly-curved convex edge 87. Flange segment 81 projects away from edge 87 and terminates distally of edge 87 with an inner inwardly-curved convex edge 88. A set of threaded bolt holes 80A extend through base 72 at spaced intervals, and a set of threaded bolt holes 81A extend through flange segment 81 at spaced intervals. As seen in FIG. 5, ring segment 71 has a generally L-shaped vertical cross-sectional shape.

When laid flat next to one another, with upper surfaces 84 facing upwardly and lower surfaces 85 facing downwardly and each opposing pair of ends 82,83 directed toward and against one another, ring segments 71 and 72 each being the mirror image of the other, ring segments 71 and 72 form adapter 70, in which bases 80 cooperate and form a coupling ring designated generally at 100, flange segments 81 cooperate and form an inverted flange designated generally at 101, inner edges 87 cooperate to form a continuous inwardly directed edge denoted generally at 102 bounding an opening 90 having a diameter D2, and edges 88 cooperate and form a continuous inwardly directed edge denoted generally at 103 bounding an opening 91 having a diameter D3. Flange 101 is smaller than flange 34. In accordance with the invention, diameter D3 of opening 91 is less than diameter D2 of opening 90, and diameter D2 of opening 90 is equal do diameter D1 of opening 34D. In other words, opening 91 is smaller than opening 90 and also opening 34D, and opening 90 is substantially equal to opening 34D. With adapter 70 so formed, bolt holes 80A of ring segments 71 and 72 match bolt holes 35A through flange 34 of container 25, and this allows adapter 70 to be fastened to inverted flange 34 with bolts 35B.

Figures 7, 8:
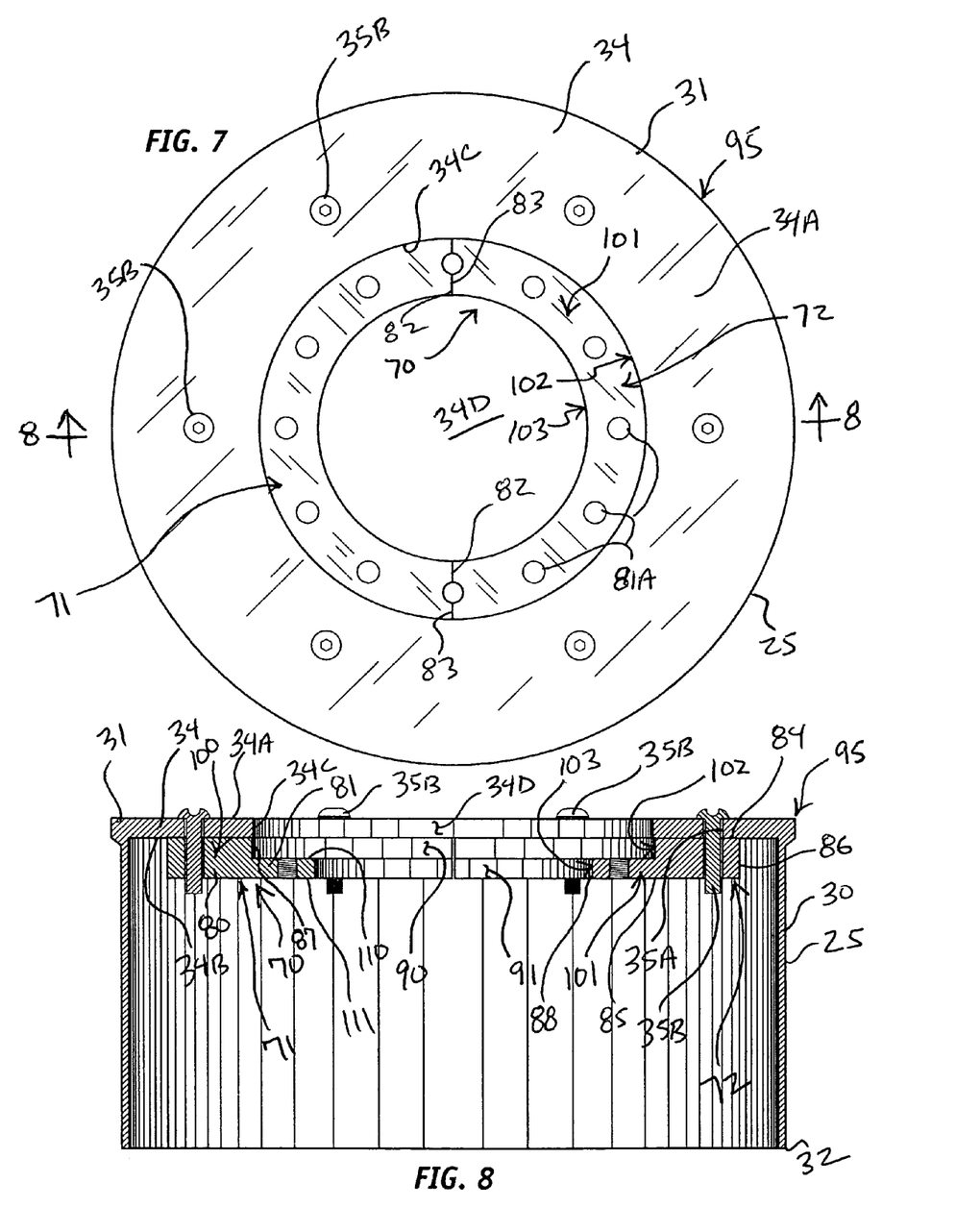
FIG. 7 is a top plan view of the light base of FIG. 1 shown as it would appear with the split ring adapter of FIG. 4 secured to the inverted flange forming an inset light base container.
FIG. 8 is a sectional view taken along line 8—8 of FIG. 7.

And so, ring segments 71 and 72, which make up adapter 70, are to be installed onto container 25 as seen in FIG. 6, to form an inset light base container as shown in FIGS. 7 and 8. To install adapter 70, ring segments 71 and 72 are taken up and passed into container 25 through opening 34D, whether at the same time or one after the other. Opening 34D is sufficiently big to permit ring segments 71 and 72 to be carefully maneuvered therethrough and into container 25. At this point in the installation procedure, and with contemporary reference in relevant part to FIG. 8, ring segment 71 is maneuvered in place in which upper surface 84 of ring segment 71 is presented against the inner face 34B of flange 34 on one side of flange 34, its bolt holes 80A aligned with a matching set of the bolt holes 35A, and then secured in place with threaded bolts 35B. Ring segment 72 is similarly installed on the opposing side of flange 34. In particular, ring segment 72 is maneuvered in place in which upper surface 84 of ring segment 71 is presented against the inner face 34B of flange 34 on one side of flange 34 directing its ends 82 and 83 toward against ends 83 and 82, respectively, of flange segment 71, its bolt holes 80A aligned with a matching set of the bolt holes 35A, and then secured in place with threaded bolts 35B.

Figure 12:
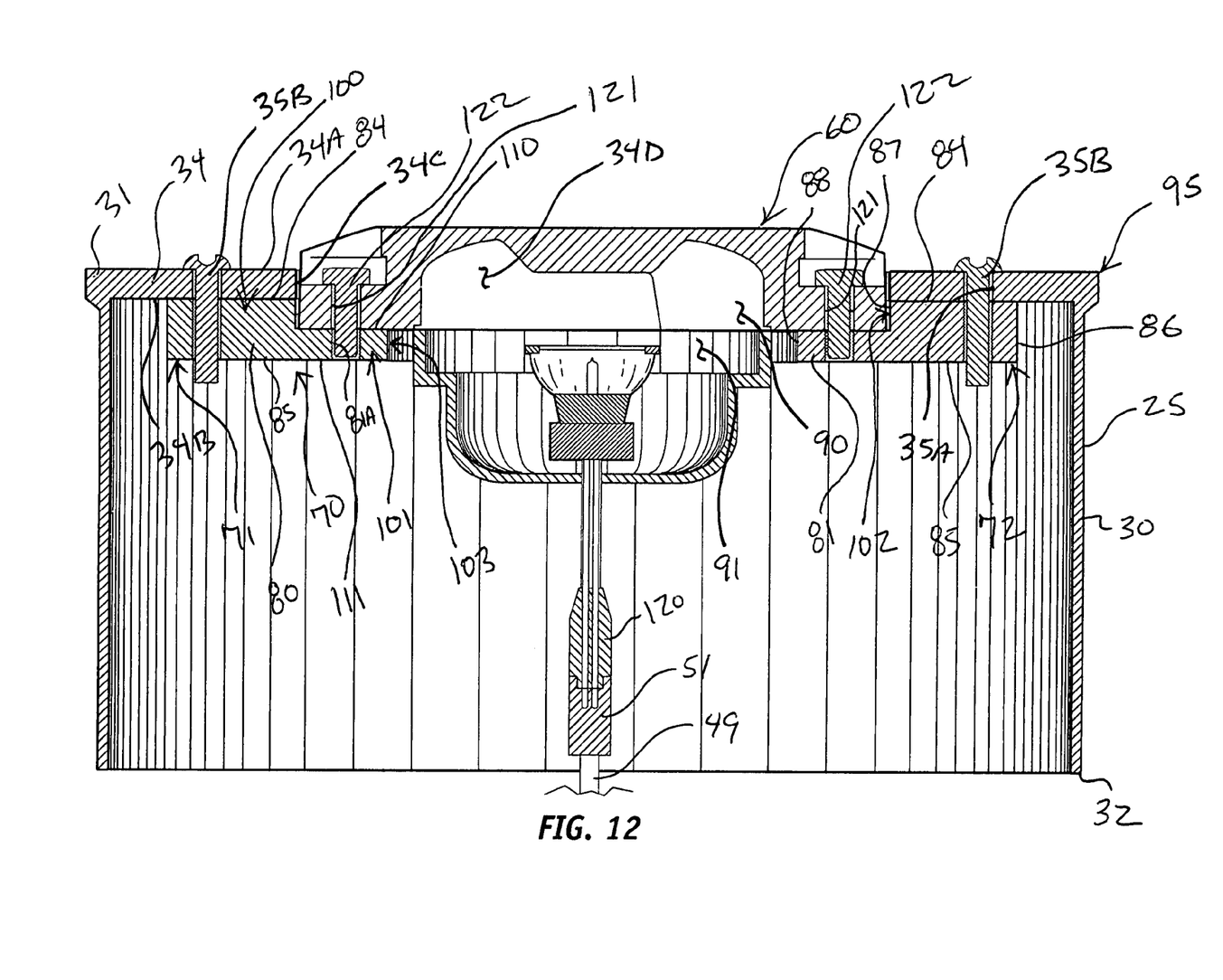
FIG. 12 is a vertical sectional view of the inset light base container of FIG. 12.

With adapter 70 so installed as seen in FIGS. 7, 8, and 12, an inset light base container 95 is formed, in which adapter 70 is located in container 25, coupling ring 100 is secured to inner face 34B of flange 34, and inverted flange 101 is for reception of an inset light fixture. Referring to FIG. 8 and also to FIG. 12, inverted flange 101 is located under opening 34D, projects outboard of continuous edges 34C and 102, terminates distally of continuous edges 34C and 102 with continuous edge 103, and is for reception of inset light fixture 60 thereon as will be explained below. Opening 90 is located between openings 34D and 91, and openings 34D, 90,91 each lead into container 25 and are essentially extensions of one another. As seen in FIG. 8, and as previously explained, it can be seen that continuous edge 102 is substantially flush with continuous edge 34C, opening 90 bound by continuous edge 102 is located between openings 34D and 91, diameter D3 of opening 91 is less than diameter D2 of opening 90, diameter D2 of opening 90 is equal do diameter D1 of opening 34D, and openings 34D, 90, and 91 are coaxial. For the purpose of orientation, inverted flange 101 defines an outer face 110 facing opening 34D and also opening 90, an opposing inner face 111 facing into container 25. Inner face 111 is actually an extension of lower surfaces 85 of ring segments 71 and 72.

Referring to FIGS. 9–11, the steps of installing inset light fixture assembly 60 are shown, which begins in FIG. 9 by positioning inset light fixture assembly 60 adjacent to inset light base container 85, coupling its plug connector 120 to connector 51 as shown in FIG. 10, placing inset light fixture assembly 60 onto outer face 110 of inverted flange 102 through openings 34D and 90 as seen in FIG. 12, aligning holes 121 of inset light fixture assembly 60 with corresponding ones of bolt holes 81A, and then securing inset light fixture 60 in place with bolts 122, which completes the installation as shown in FIGS. 11 and 12 forming an inset light installation. Bolt holes 81A are arranged so that any pair of opposing ones of bolt holes 81A may be readily aligned with holes 121 is inset light fixture assembly 60. In other words, holes 121 match any pair of opposing bolt holes 81A through inverted flange 101, allowing inset light fixture assembly 60 to be fastened in place with bolts 122. As best seen in FIG. 12, inset light fixture assembly 60 is smaller than openings 34D and 90, and yet larger than opening 91. Continuous edges 102 and 103 and outer face 110 of inverted flange 101 together make a recess or pocket that accommodates inset light fixture assembly 60.

It is to be understood, therefore, that container 25 as shown in FIGS. 1–3 is an elevated light base container and that flange 34 of container 25 is used in conjunction elevated light fixture assembly 21, and that adapter 70 is used with inset light fixture assembly 21. By removing elevated light fixture assembly 21 from container and installing adapter 70 to it in accordance with the principle of the invention as herein described, container 25 is easily and efficiently converted into inset light base container 95 with load characteristics no different from the original container, in which inverted flange 101 is for reception of inset light fixture 60 thereon so as to form an inset light installation, which may form part of an airport lighting system.

The invention has been described above with reference to preferred embodiments. However, those skilled in the art will recognize that changes and modifications may be made to the embodiments without departing from the nature and scope of the invention. For instance, although adapter 70 is made up of two ring segments 71 and 72, it can be made up of more than two ring segments, if desired. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

The invention claimed is:

1. An airport light base, comprising:
   a light base container having an upper end with an inverted first flange having a first outer face, an opposing first inner face facing into the light base container, and a continuous inwardly directed first edge bounding a first opening into the light base container;
   ring segments, affixed to the inner face of the first flange, forming an inverted second flange under the first opening outboard of the first edge, the second flange for reception of an inset light fixture thereon and having a second outer face facing the first opening, an opposing second inner face facing into the light base container, and a continuous inwardly directed second edge bounding a second opening into the light base container, wherein the second opening is smaller than the first opening; and
   a continuous inwardly directed third edge formed by the ring segments between the first and second flanges, which is substantially flush with the first edge and defining a third opening substantially equal in size to, and forming an extension of, the first opening.

2. The airport light base according to claim 1, further comprising:
   first bolt holes through the first flange registering with second bolt holes through the ring segments; and
   bolts through the first and second bolt holes securing the ring segments to the first flange.

3. The airport light base according to claim 1, wherein the ring segments further comprise equally-sized first and second ring segments.

4. The airport light base according to claim 1, further comprising an inset light fixture affixed to the second outer face of the second flange.

5. An airport lighting system incorporating the airport light base according to claim 1.

6. In an airport light base container having an upper end with an inverted first flange having a first outer face, an opposing first inner face facing into the light base container, and a first continuous inwardly directed edge bounding a first opening into the light base container, improvements therein comprising ring segments, affixed to the inner face of the first flange, forming an inverted second flange under the first opening outboard of the first edge, the second flange for reception of an inset light fixture thereon and having a second outer face facing the first opening, an opposing second inner face facing into the light base container, a continuous inwardly directed second edge bounding a second opening into the light base container smaller than the first opening, and a continuous inwardly directed third edge formed by the ring segments between the first and second flanges, which is substantially flush with the first edge and defining a third opening substantially equal in size to, and forming an extension of, the first opening.

7. The improvements according to claim 6, further comprising:
   first bolt holes through the first flange registering with second bolt holes through the ring segments; and
   bolts through the first and second bolt holes securing the ring segments to the first flange.

8. The improvements according to claim 6, wherein the ring segments further comprise equally-sized first and second ring segments.

9. The improvements according to claim 6, further comprising an inset light fixture affixed to the second outer face of the second flange.

10. An airport lighting system incorporating the improvements of claim 6.

11. An airport light base, comprising:
    a light base container having an upper end with an inverted first flange having a continuous inwardly directed first edge bounding a first opening into the light base container;
    ring segments, affixed to the first flange, forming an inverted second flange outboard of the first edge for reception of an inset light fixture thereon and having a continuous inwardly directed second edge bounding a second opening into the light base container, wherein the second opening is smaller than, and coaxial with, the first opening; and
    a continuous inwardly directed third edge formed by the ring segments between the first and second flanges, which is substantially flush with the first edge and defining a third opening substantially equal in size to, and forming an extension of, the first opening.

12. The airport light base according to claim 11, further comprising:
    first bolt holes through the first flange registering with second bolt holes through the ring segments; and
    bolts through the first and second bolt holes securing the ring segments to the first flange.

13. The airport light base according to claim 11, wherein the ring segments further comprise equally-sized first and second ring segments.

14. The airport light base according to claim 11, further comprising an inset light fixture affixed to the second flange.

15. An airport lighting system incorporating the airport light base according to claim 11.

16. In an airport light base container having an upper end with an inverted first flange having a continuous inwardly directed first edge bounding a first opening into the light base container, improvements therein comprising ring segments, affixed to the first flange, forming an inverted second flange outboard of the first edge for reception of an inset light fixture thereon and having a continuous inwardly directed second edge bounding a second opening into the light base container, wherein the second opening is smaller than, and coaxial with, the first opening, and a continuous inwardly directed third edge formed by the ring segments between the first and second flanges, which is substantially flush with the first edge and defining a third opening substantially equal in size to, and forming an extension of, the first opening.

17. The improvements according to claim 16, further comprising:
    first bolt holes through the first flange registering with second bolt holes through the ring segments; and
    bolts through the first and second bolt holes securing the ring segments to the first flange.

18. The improvements according to claim 16, wherein the ring segments further comprise equally-sized first and second ring segments.

19. The improvements according to claim 16, further comprising an inset light fixture affixed to the second flange.

20. An airport lighting system incorporating the improvements according to claim 16.

* * * * *